(12) United States Patent
Kim et al.

(10) Patent No.: US 9,012,052 B2
(45) Date of Patent: Apr. 21, 2015

(54) BATTERY PACK INCLUDING AN ADHESION SHEET

(75) Inventors: Jae-Seung Kim, Yongin-si (KR); Seok Koh, Yongin-si (KR)

(73) Assignee: Samsung SCI Co., Ltd., Yongin-si, Gyeonggi-do (KR)

( * ) Notice: Subject to any disclaimer, the term of this patent is extended or adjusted under 35 U.S.C. 154(b) by 595 days.

(21) Appl. No.: 13/200,374

(22) Filed: Sep. 23, 2011

(65) Prior Publication Data
US 2012/0251856 A1 Oct. 4, 2012

(30) Foreign Application Priority Data
Apr. 1, 2011 (KR) .......................... 10-2011-0030286

(51) Int. Cl.
H01M 2/12 (2006.01)
H01M 2/02 (2006.01)

(52) U.S. Cl.
CPC .................................. H01M 2/0267 (2013.01)

(58) Field of Classification Search
USPC ........................................................ 429/82
See application file for complete search history.

(56) References Cited

U.S. PATENT DOCUMENTS

| | | | | |
|---|---|---|---|---|
| 5,004,655 A * | 4/1991 | Symanski | ........................ | 429/82 |
| 5,707,757 A * | 1/1998 | Lee | .................................. | 429/86 |
| 7,727,615 B2 | 6/2010 | Kato et al. | | |
| 2009/0311592 A1* | 12/2009 | You et al. | ........................ | 429/162 |
| 2011/0197435 A1* | 8/2011 | Kaneko et al. | ................ | 29/623.2 |

FOREIGN PATENT DOCUMENTS

| | | |
|---|---|---|
| JP | 07-305488 A | 11/1995 |
| JP | 4443448 B | 1/2010 |
| KR | 10-2011-0107526 | 10/2011 |

* cited by examiner

Primary Examiner — Patrick Ryan
Assistant Examiner — Lucas J O Donnell
(74) Attorney, Agent, or Firm — Lee & Morse, P.C.

(57) ABSTRACT

A battery pack includes a battery cell; a case housing the battery cell; and an adhesion sheet surrounding at least a portion of an exterior surface of the case, wherein the adhesion sheet includes a base part and an adhesion part, the base part having a bending line corresponding in position to an edge of the case, and the adhesion part being on a bottom surface of the base part and including air exhaustion paths.

14 Claims, 6 Drawing Sheets

BATTERY PACK INCLUDING AN ADHESION SHEET

BACKGROUND

1. Field

One or more embodiments relate to a battery pack.

2. Description of the Related Art

Due to increasing demand for technical development and need for mobile devices, demand for secondary batteries as an energy source is sharply increasing.

Secondary batteries may be widely classified into circular-shaped batteries, angular-shaped batteries, pouch-shaped batteries, and the like according to exterior shapes of the secondary batteries, or may be classified according to types of electrolyte solutions. Recently, as mobile devices become smaller, demand for angular-shape batteries having small thicknesses and pouch-shape batteries increases.

In general, secondary batteries are classified into hard packs and inner packs according to how the secondary batteries are mounted on cases. A hard pack forms a part of an exterior shape of an external device on which the hard pack is mounted. However, a case should generally be designed so as to match a corresponding external device while the battery cell is mounted on the case.

On the other hand, an inner pack is used by mounting the inner pack in an external device, and a cover forming a part of the external device covers the inner pack. In order to protect contents of the inner pack or to provide information about the inner pack, an insulating sheet may be adhered on a most-exterior surface thereof.

SUMMARY

Embodiments are therefore directed to a battery pack.

According to one or more embodiments, a battery pack includes a battery cell, a case housing the battery cell, and an adhesion sheet surrounding at least a portion of an exterior surface of the case, wherein the adhesion sheet includes a base part and an adhesion part, the base part having a bending line corresponding in position to an edge of the case, and the adhesion part being on a bottom surface of the base part and including air exhaustion paths.

The bending line may be formed on a top surface of the base part. A depth of the bending line may be less than a thickness of the base part. The bending line may be groove in a shape of a continuous line extending in one direction.

The air exhaustion paths may be fluidically connected to an exterior of the case. The air exhaustion paths may be in fluid communication with each other.

The adhesion part may include adhesion sections. Each adhesion section may include an adhesive material. The air exhaustion paths may have grooves adjacent to at least one side of each of the adhesion sections.

Each adhesion section may be surrounded by air exhaustion paths. The air exhaustion paths may have a lattice-shape pattern.

The bending line may be on an area corresponding to the position of the adhesion sections.

The adhesion sheet may include a label of the battery pack.

The bending line may be a groove in the shape of an unbroken line extending from an end of the base part toward another end of the base part.

The air exhaustion paths may be disposed in parallel with respect to each other. An adhesive material may be disposed between at least two air exhaustion paths.

The bending line may overlap and extend along a corner of the case.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
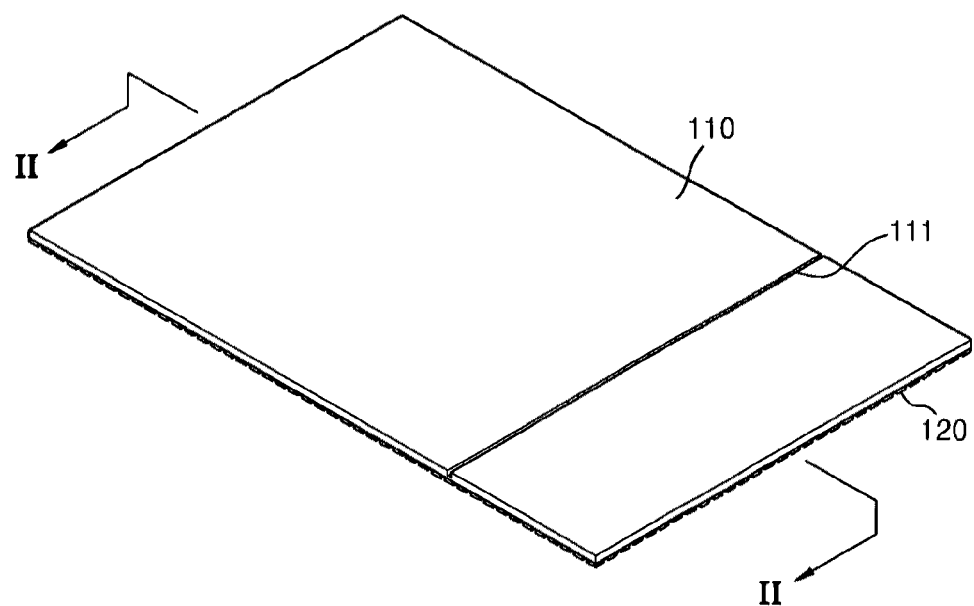
FIG. 1 illustrates a perspective view of an adhesion sheet according to an embodiment.

Korean Patent Application No. 10-2011-0030286, filed on Apr. 1, 2011, in the Korean Intellectual Property Office, and entitled: "Battery Pack," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element or substrate, it can be directly on the other element or substrate, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout.

Furthermore, all examples and conditional language recited herein are to be construed as being without limitation to such specifically recited examples and conditions. Throughout the specification, a singular form may include plural forms, unless there is a particular description contrary thereto. Also, terms such as "comprise" or "comprising" are used to specify existence of a recited form, a number, a process, an operations, a component, and/or groups thereof, not excluding the existence of one or more other recited forms, one or more other numbers, one or more other processes, one or more other operations, one or more other components, and/or groups thereof. While such terms as "first," "second," etc., may be used to describe various components, such components must not be limited to the above terms. The above terms are used only to distinguish one component from another.

Figure 2:
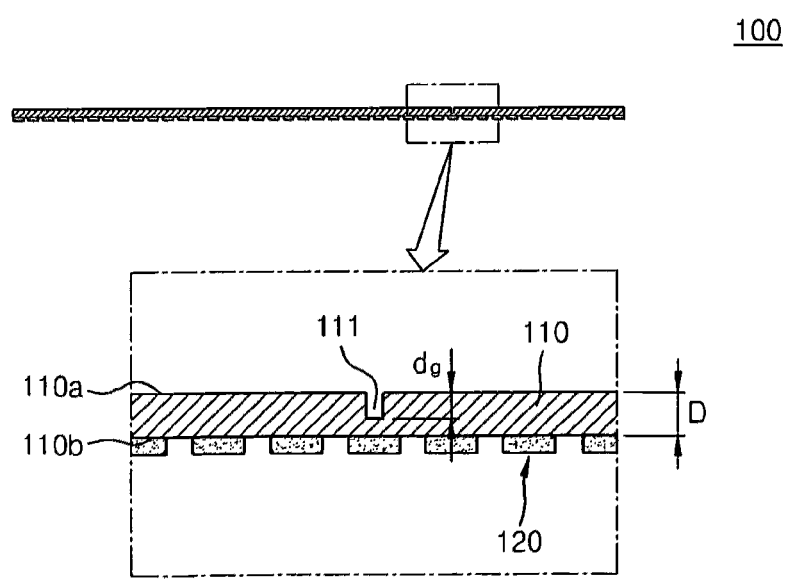
FIG. 2 illustrates a cross-sectional view of the adhesion sheet of FIG. 1, taken along a line II-II of FIG. 1.
Figure 3:
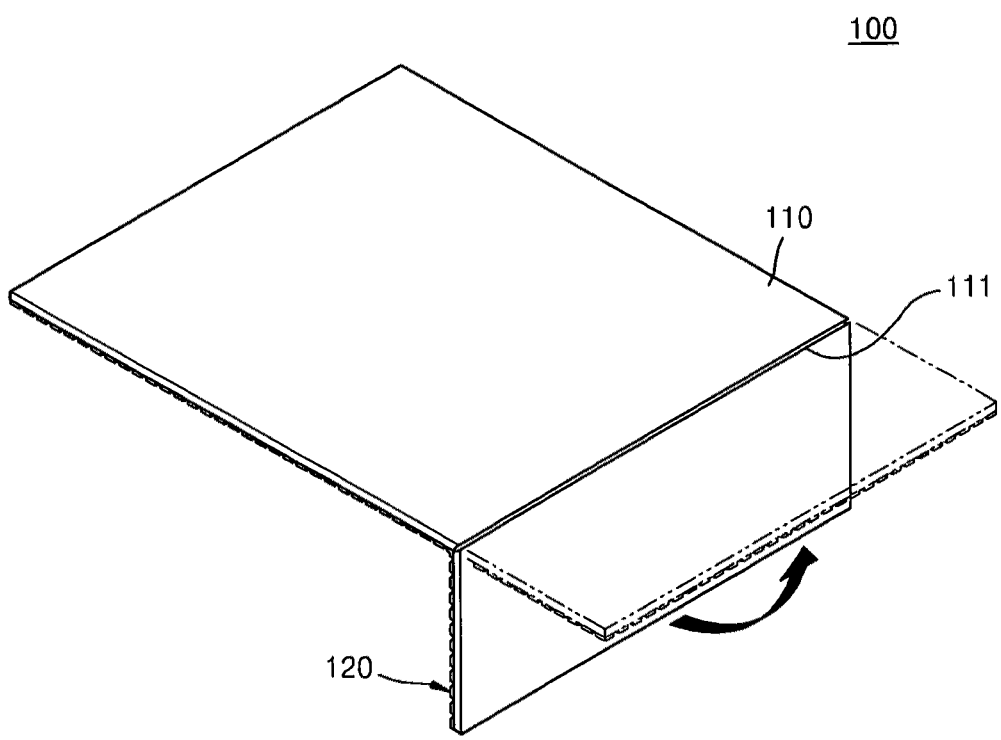
FIG. 3 illustrates a perspective view of a state of the adhesion sheet of FIG. 1 in which the adhesion sheet is bent or unbent along a bending line.

FIG. 1 illustrates a perspective view of an adhesion sheet 100 according to an embodiment. FIG. 2 illustrates a cross-sectional view of the adhesion sheet 100, taken along a line II-II of FIG. 1. FIG. 3 illustrates a perspective view of a state of the adhesion sheet 100, in which the adhesion sheet 100 may be bendable along a bending line 111.

Referring to FIGS. 1 and 2, the adhesion sheet 100 may include a base part 110 and an adhesion part 120 disposed on one surface of the base part 110.

The base part 110 is a layer that is externally exposed. The base part 110 may give durability to the adhesion sheet 100 and may function as a protective part that prevents a surface of a target object, on which the adhesion sheet 100 is to be adhered, from being damaged. The base part 110 may be formed of a material having relatively high tensile strength and relatively excellent weather-resistance.

The base part 110 may include a resin material. For example, the resin material may include a polyolefin, e.g., polyethylene and/or polypropylene, a polyester, e.g., polyethyleneterepthalate and/or polybutyleneterepthalate, polyvinylchloride, polystyrene, polyurethane, polycarbonate, polyamide, polymethylmethacrylate, polybutene, polybutadiene, or the like.

The bending line 111 may prevent a crease from being formed on the base part 110 when the adhesion sheet 100 is bent and then unbent. For this prevention, the bending line 111 may be formed as a groove in the shape of a solid line extending in one direction on a top surface 110a of the base part 110. For example, the bending line 111 may be formed as a solid line extending, e.g., continuously, from an end of the base part 110 toward another end of the base part 110. In a comparative example with respect to the present embodiment, when an adhesion sheet not having a bending line is bent and then straightened, a crease may be formed in an area where the adhesion sheet was bent. However, according to the present embodiment, the bending line 111 may be formed on the top surface 110a of the base part 110, so that, as illustrated in FIG. 3, even when the adhesion sheet 100 is bent and then straightened, a crease is not formed on the base part 110.

Referring back to FIG. 2, a depth $d_g$ of the bending line 111 may be less than a thickness D of the base part 110, i.e., a distance between the top surface 110a and a bottom surface 110b. The bending line 111 may be formed by applying a predetermined amount of pressure to the base part 110 by using a separate pressing member (not shown). Here, the pressing member may have the same shape as a shape of the bending line 111 to be formed, and the depth $d_g$ of the bending line 111 may correspond to a pressure depth to which the pressing member is pressed into the base part 110. When the depth $d_g$ of the bending line 111 is too great, the base part 110 may be cut into two parts. The pressing member may press the base part 110 so as to allow the depth $d_g$ of the bending line 111 to be less than the thickness D of the base part 110.

Figure 4:
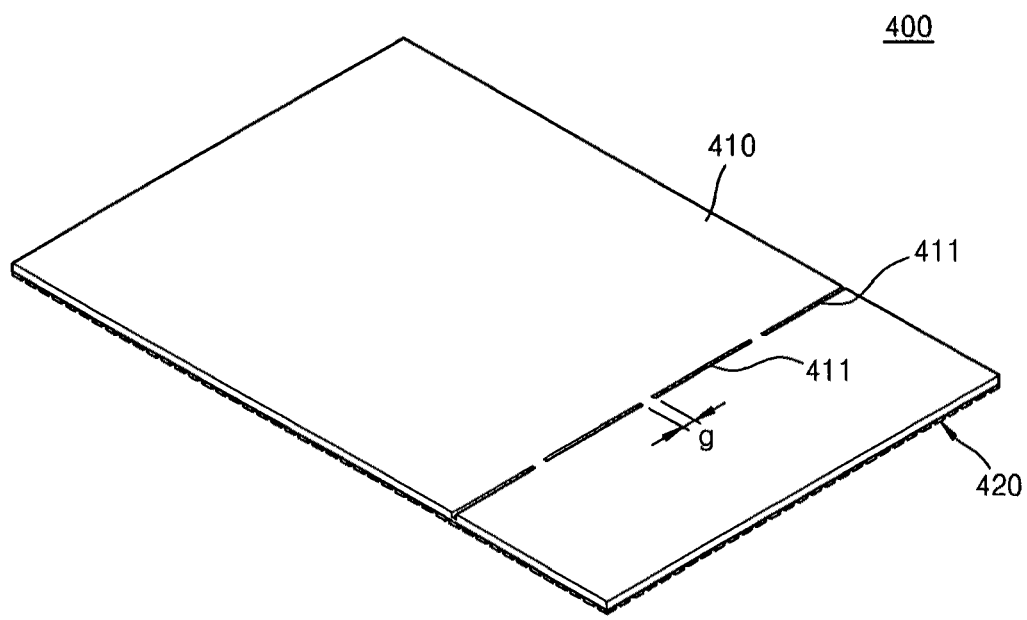
FIG. 4 illustrates a perspective view of an adhesion sheet according to another embodiment.

In the present embodiment, the bending line 111 may be formed as a solid line or groove extending in one direction but one or more embodiments are not limited thereto. For example, referring to FIG. 4, a bending line 411 may be a groove in the shape of a broken line. For example, bending line 411 may include a plurality of lines extending in one direction, with gaps formed between the plurality of lines. In this case, when a gap g between the plurality of bending lines is too large, a crease may be formed when an adhesion sheet 400 is bent and then straightened. Thus, the gap g between the bending lines may be narrow. An adhesion part 420 may be formed on a bottom surface of the adhesion sheet 400.

Figure 5A:
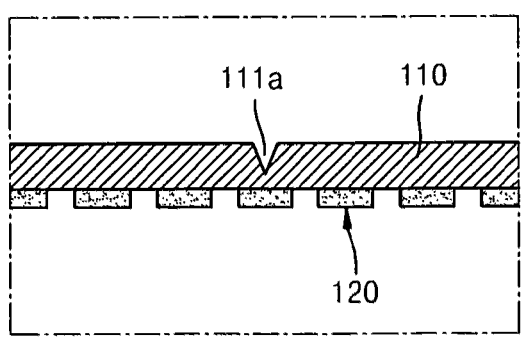
FIGS. 5A and 5B illustrate magnified cross-sectional views of an adhesion sheet according to other embodiments.
Figure 5B:
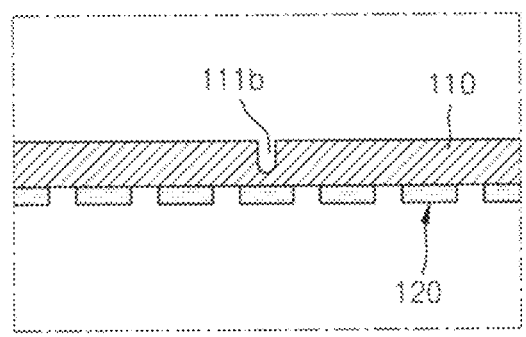

According to the present embodiment, a cross-sectional area of the bending line 111 may be quadrangular, as illustrated in FIG. 2, but one or more embodiments are not limited thereto. For example, referring to FIGS. 5A and 5B illustrating other embodiments, cross-sectional areas of bending lines 111a and 111b may be inverted-triangular or may be U-shaped, respectively.

Figure 6:
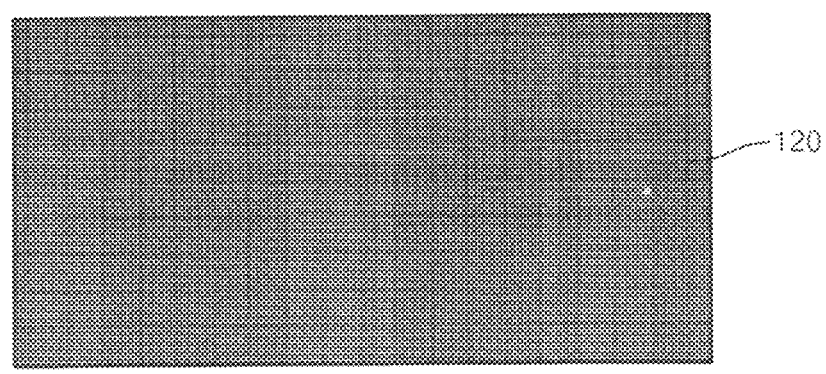
FIG. 6 illustrates a bottom view of the adhesion sheet of FIG. 1.
Figure 7:
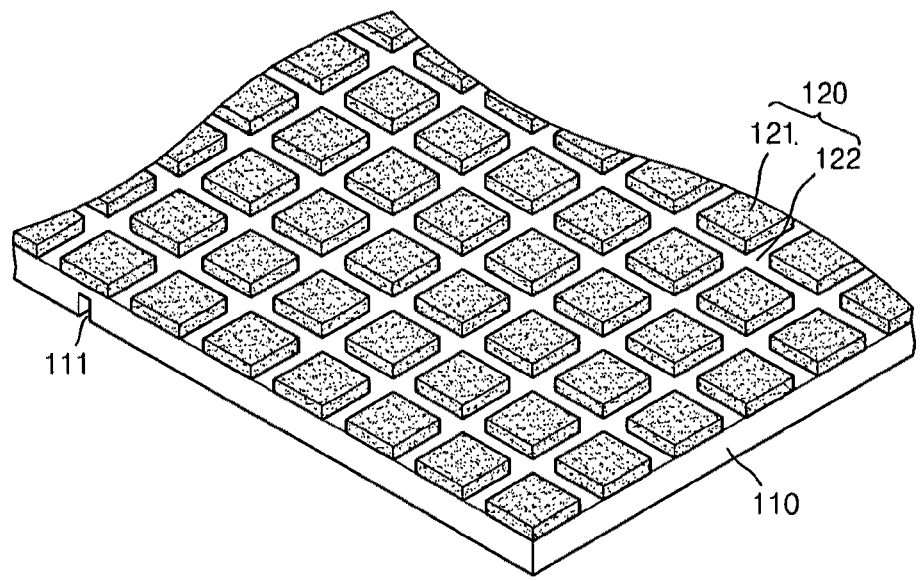
FIG. 7 illustrates a magnified perspective view of a portion of the adhesion sheet of FIG. 6.

FIG. 6 is a bottom view of the adhesion sheet 100 of FIG. 1, illustrating the adhesion sheet 100 from its bottom. FIG. 7 is a magnified perspective view of a portion of the adhesion sheet 100 of FIG. 6.

Referring to FIGS. 6 and 7, the adhesion part 120 may be formed on the bottom surface 110b of the base part 110 (see FIG. 2), and may include adhesion sections 121 and air exhaustion paths 122 through which air passes. For example, the adhesion sections 121 may be a plurality of discrete portions spaced apart from each other, e.g., two adjacent adhesion sections 121 may be separated via the air exhaustion paths 122.

The adhesion sections 121 may include an adhesive material that allows the adhesion sheet 100 to be adhered to the target object. For example, the adhesion sections 121 may include an acryl-based material, a polyester-based material, a polyurethane-based material, a rubber-based material, a silicon-based material, or the like.

The adhesion sections 121 may be formed on an area corresponding to the bending line 111 by having the base part 110 formed therebetween, e.g., the adhesion sections 121 may overlap the bending line 111. The adhesion sheet 100 may be disposed in such a manner that the bending line 111 corresponds to a corner or edge of the target object, and in this case, the adhesion sections 121 formed on the area corresponding to the bending line 111 may adhere the adhesion sheet 100 to the target object, so that it is possible to prevent the adhesion sheet 100 from coming off of the corner or edge of the target object.

The air exhaustion paths 122 may prevent air from being confined between the adhesion sheet 100 and the target object, and bubbles from being formed, when the adhesion sheet 100 is adhered to the target object. The air exhaustion paths 122 may have a groove shape with respect to the adhesion sections 121 and may extend to an end, e.g., an external edge, of the adhesion sheet 100. Thus, the adhesion sections 121 may be fluidically connected to the outside, e.g., an exterior of the adhesion sheet 100. For example, air may travel between the adhesion sheet 100 and the target object via the air exhaustion paths 122.

The air exhaustion paths 122 may be in fluid communication with each other, thereby forming a network. For example, the air exhaustion paths 122 may form a lattice-shape pattern. The air in the adhesion sheet 100 may be distributed and may move in various directions via the air exhaustion paths 122, which are connected to each other, so that it is possible to prevent bubbles from being formed in the adhesion sheet 100 and to increase an air exhaustion efficiency.

The air exhaustion paths 122 may form the lattice-shape pattern. As such, the adhesion sections 121 may be surrounded by the air exhaustion paths 122. Unlike the air exhaustion paths 122, which are connected to each other, the adhesion sections 121 may be separate from each other.

In the present embodiment, the air exhaustion paths 122 may form the lattice-shape pattern, and the adhesion sections 121 may be quadrangular. However, one or more embodiments are not limited thereto. For example, the air exhaustion paths 122 may be fluidically connected to each other while the adhesion sections 121 may be round, oval, or polygonal.

Figure 8:
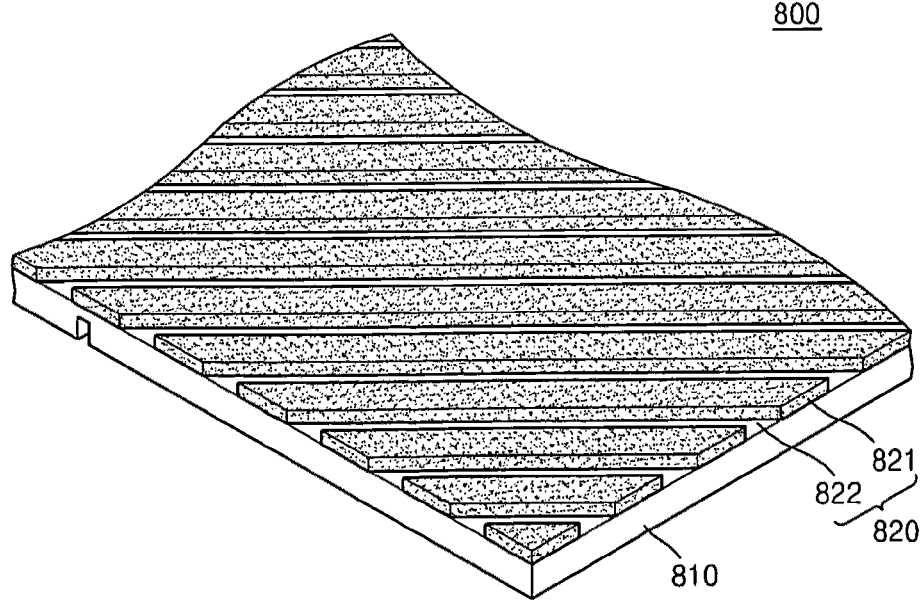
FIG. 8 illustrates a magnified perspective view of an adhesion sheet according to another embodiment, in which an adhesion part is upwardly exposed.

FIG. 8 is a perspective view of an adhesion sheet 800 according to another embodiment, in which an adhesion part 820 is upwardly exposed.

Referring to FIG. 8, the adhesion sheet 800 may include a base part 810, and the adhesion part 820 may be arranged on one surface of the base part 810. The adhesion part 820 may be the same as the adhesion part 120 described with reference to FIGS. 6 and 7 in that the adhesion part 820 may include adhesion sections 821 and air exhaustion paths 822. However, according to the present embodiment, the adhesion part 820 may be different from the adhesion part 120 with respect to the shapes of the air exhaustion paths 822 and the adhesion sections 821. Hereinafter, the differences between the adhesion part 820 and the adhesion part 120 will be described.

The adhesion sections 821 may be formed parallel to each other, so that the air exhaustion paths 822 arranged between the adhesion sections 821 may also be formed parallel to each other. In the present embodiment, the air exhaustion paths 822 may extend to an end of the adhesion sheet 800, e.g., may extend diagonally between two external edges of the adhesion sheet 100, and thus may be fluidically connected to the outside or exterior of the adhesion sheet 100. Air in the adhesion sheet 800 may be externally exhausted along the air exhaustion paths 822, which are disposed in parallel. In the present embodiment, the air exhaustion paths 822 may not be connected to each other. As such, the adhesion sheet 800 may be adhered to a target object along an extension direction of the adhesion sections 821 so as to facilitate movement of air through the air exhaustion paths 822.

The aforementioned adhesion sheets 100, 400, and 800 may be arranged on an exterior-most layer of a battery pack and then may be used as a label of the battery pack. Hereinafter, a case in which an adhesion sheet is arranged on a battery pack will be described in detail.

Figure 9:
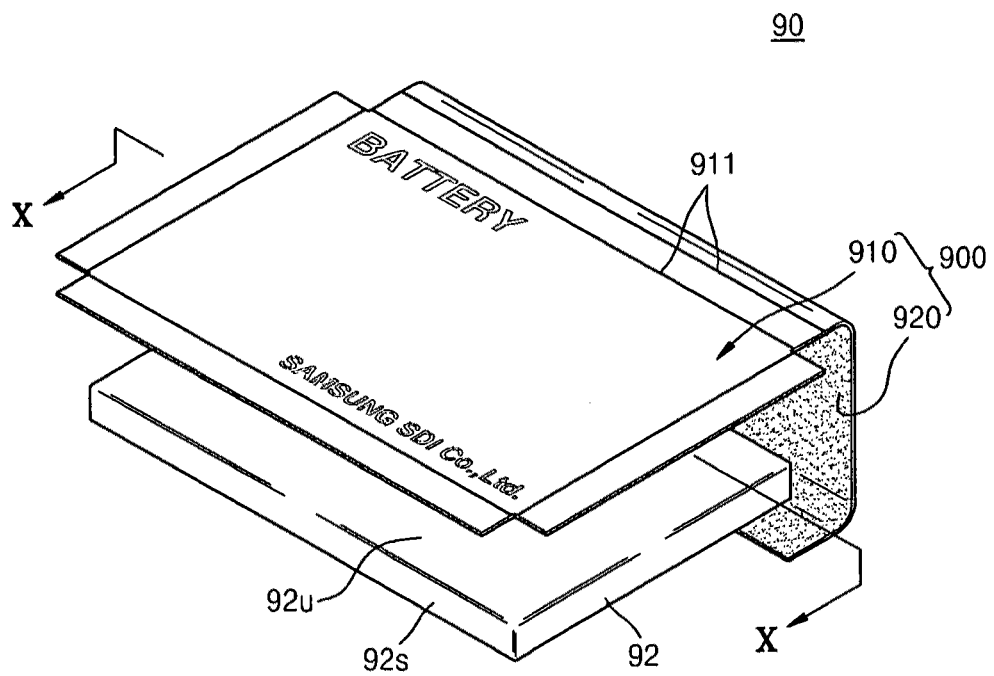
FIG. 9 illustrates a perspective view of a battery pack, according to an embodiment.
Figure 10:
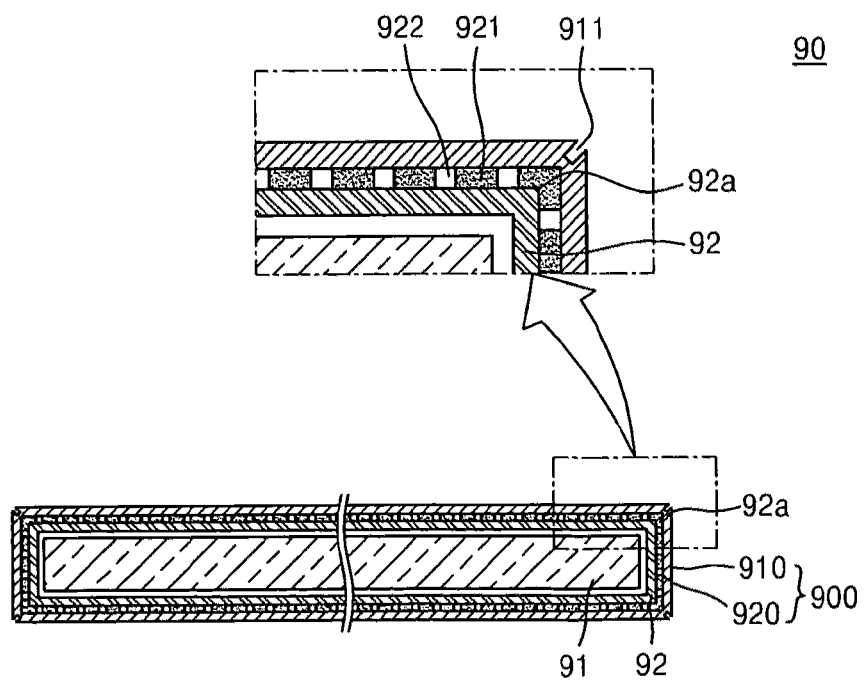
FIG. 10 illustrates a cross-sectional view of the battery pack of FIG. 9, taken along a line X-X of FIG. 9 and having an adhesion sheet adhered to an exterior surface of a case of the battery pack.

FIG. 9 illustrates a perspective view of a battery pack 90, according to an embodiment. FIG. 10 illustrates a cross-sectional view of the battery pack 90, taken along a line X-X of FIG. 9 and having an adhesion sheet 900 adhered to an exterior surface of a case 92 of the battery pack 90.

Referring to FIGS. 9 and 10, the battery pack 90 may include a battery cell 91, the case 92, and the adhesion sheet 900.

The battery cell 91 may be included in the case 92. The battery cell 91 may include a cell or may include a plurality of cells so as to provide a battery pack having a high output and high capacity. Although not illustrated in FIGS. 9 and 10, the battery cell 91 may be electrically connected to a protective circuit module.

Exterior surfaces 92u, 92s of the case 92 may be surrounded by the adhesion sheet 900. For example, the adhesion sheet 900 may surround, e.g., overlap, an upper surface 92u and side surfaces 92s of the case 92. One of the adhesion sheets described above with reference to FIGS. 1 through 8 may be used as the adhesion sheet 900. The adhesion sheet 900 may have a mechanical strength and a surface hardness, so that the adhesion sheet 900 may maintain stability of the battery pack 90 and may prevent deterioration due to an external shock or scratches. The adhesion sheet 900 may be adhered while being bent along the exterior surfaces of the case 92 having a cubic shape. For this adhesion, a bending line 911 may be formed on the adhesion sheet 900 before being adhered to the case 92, and the adhesion sheet 900 may correspond to a size of the cubic shape of the case 92.

When the adhesion sheet 900 is adhered to the case 92, air interposed between the adhesion sheet 900 and the case 92 may be exhausted via an air exhaustion path 922 formed in an adhesion part 920. As such, as described above, bubble formation between the adhesion sheet 900 and the case 92 may be avoided.

Also, as described above, the bending line 911 of the adhesion sheet 900 may be formed in an area corresponding to an adhesion section 921. For example, the bending line 911 may correspond to an edge 92a, e.g., the bending line 911 may overlap and extend along the edge 92a. As such, it may be possible to prevent the adhesion sheet 900 from coming off of edges, e.g., corners, of the case 92.

In the present embodiment, the adhesion sheet 900 may completely surround the exterior surfaces of the case 92 but one or more embodiments are not limited thereto. For example, the adhesion sheet 900 may be adhered to only some of the surfaces of the case 92.

According to one or more embodiments, by forming an air exhaustion path in an adhesion part, it may be possible to effectively prevent air from being confined or bubbles from being formed when an adhesion sheet is adhered to a target object.

According to one or more embodiments, a bending line may be formed on the base part, so that, even when an adhesion sheet is bent and then straightened, it is possible to effectively prevent a crease from being formed on the adhesion sheet, thereby preventing ruining an exterior of the battery pack.

According to various embodiments, the battery pack may be mounted in an external device with relative ease. The battery pack, e.g., inner pack, may be easy to design, low-priced, and have compatibility with an external device. The adhesion sheet of the battery pack does not ruin an exterior of the battery pack and is effectively adhered on the battery pack.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present embodiments as set forth in the following claims.

What is claimed is:

1. A battery pack, comprising:
    a battery cell;
    a case housing the battery cell; and
    an adhesion sheet surrounding at least a portion of an exterior surface of the case,
    wherein the adhesion sheet includes a base part and an adhesion part, the base part having a bending line corresponding in position to an edge of the case, and the adhesion part being on a bottom surface of the base part and including air exhaustion paths, the air exhaustion paths extending in one or more directions parallel to the base part and being fluidically connected to an exterior of the case.

2. The battery pack as claimed in claim 1, wherein the bending line is on a top surface of the base part.

3. The battery pack as claimed in claim 1, wherein a depth of the bending line is less than a thickness of the base part.

4. The battery pack as claimed in claim 1, wherein the bending line is a groove in a shape of a continuous line extending in one direction.

5. The battery pack as claimed in claim 1, wherein the air exhaustion paths are in fluid communication with each other.

6. The battery pack as claimed in claim 1, wherein the adhesion part further comprises adhesion sections, each adhesion section having an adhesive material, and the air exhaustion paths including grooves adjacent to at least one side of each of the adhesion sections.

7. The battery pack as claimed in claim 6, wherein each adhesion section is surrounded by air exhaustion paths.

8. The battery pack as claimed in claim 7, wherein the air exhaustion paths have a lattice-shape pattern.

9. The battery pack as claimed in claim 6, wherein the bending line is on an area corresponding to the position of the adhesion sections.

10. The battery pack as claimed in claim 1, wherein the adhesion sheet includes a label for the battery pack.

11. The battery pack as claimed in claim 1, wherein the bending line is a groove in a shape of an unbroken line extending from an end of the base part toward another end of the base part.

12. The battery pack as claimed in claim 1, wherein the air exhaustion paths are disposed parallel with respect to each other.

13. The battery pack as claimed in claim 12, wherein an adhesive material is disposed between at least two air exhaustion paths.

14. The battery pack as claimed in claim 1, wherein the bending line overlaps and extends along a corner of the case.

* * * * *

UNITED STATES PATENT AND TRADEMARK OFFICE
CERTIFICATE OF CORRECTION

PATENT NO. : 9,012,052 B2
APPLICATION NO. : 13/200374
DATED : April 21, 2015
INVENTOR(S) : Jae-Seung Kim and Seok Koh It is certified that error appears in the above-identified patent and that said Letters Patent is hereby corrected as shown below:

Title page, item (73) should read Assignee: SAMSUNG SDI CO., LTD. Yongin-si, Gyeonggi-do, (KR)

Signed and Sealed this
Eleventh Day of August, 2015

Michelle K. Lee
*Director of the United States Patent and Trademark Office*